United States Patent
Taguchi et al.

(10) Patent No.: US 6,874,157 B2
(45) Date of Patent: Mar. 29, 2005

(54) DISK CASE

(75) Inventors: Hirofumi Taguchi, Yokohama (JP);
Kenji Ogiro, Yokohama (JP);
Kyuichiro Nagai, Fujisawa (JP);
Hikaru Mizutani, Minoo (JP); Shyunji Furukawa, Kitasoba (JP); Minoru Fujita, Kitasoba (JP)

(73) Assignee: Hitachi, Ltd., Tokyo (JP)

( * ) Notice: Subject to any disclaimer, the term of this patent is extended or adjusted under 35 U.S.C. 154(b) by 72 days.

(21) Appl. No.: 10/109,065

(22) Filed: Mar. 29, 2002

(65) Prior Publication Data

US 2002/0185393 A1 Dec. 12, 2002

(30) Foreign Application Priority Data

Jun. 12, 2001 (JP) ........................................ 2001-176776

(51) Int. Cl.⁷ .............................................. G11B 23/03
(52) U.S. Cl. ..................... 720/719; 369/291.1; 360/133
(58) Field of Search ............................. 206/308.1, 309, 206/312, 310; 369/29.1, 290, 291.1; 360/133; 720/719; G11B 23/03

(56) References Cited

U.S. PATENT DOCUMENTS

| | | | | |
|---|---|---|---|---|
| 5,293,293 A | * | 3/1994 | Iwata et al. ................. 360/133 |
| 5,447,768 A | * | 9/1995 | Takahashi ................... 428/66.6 |
| 5,713,463 A | * | 2/1998 | Lakoski et al. ........... 206/308.1 |
| 6,078,563 A | * | 6/2000 | Goto et al. .................. 360/133 |
| 6,377,538 B1 | * | 4/2002 | d'Alayer de Costemore d'Arc ........ 369/291 |
| 6,600,718 B2 | * | 7/2003 | Shimada et al. ............ 369/290 |

FOREIGN PATENT DOCUMENTS

| | | |
|---|---|---|
| JP | 6-302142 | 10/1994 |
| JP | 9-265752 | 10/1997 |
| JP | 9-282829 | 10/1997 |
| JP | 11-273292 | 10/1999 |
| JP | 2000-260151 | 9/2000 |

* cited by examiner

Primary Examiner—David T. Fidei
(74) Attorney, Agent, or Firm—McDermott Will & Emery LLP

(57) ABSTRACT

A disk case in which the downsizing of a disk is enabled, maintaining the ease of handling in the same manner as the current 8-cm disk cartridge, and that can be mounted on the current 12-cm drive by using a simplified adapter is provided.

The shape of the disk case that involves an 8-cm disk is not a square but almost a circle. Further, the opening width of the disk case is 39 mm or more. An arm for ejecting the disk is arranged at the disk case opening side.

4 Claims, 8 Drawing Sheets

DISK CASE

BACKGROUND OF THE INVENTION

1. Field of the Invention

The present invention relates to a disk-type medium, such as an optical disk and a magneto-optical disk, and, more particularly, to a disk case that can exchangeably accommodate a disk in which the recording of information is enabled.

2. Description of the Related Art

To date, as a disk-type recording medium, for example, a write once or rewritable optical disk is being used. When this type of disk is mounted on or dismounted from a recorder and/or a disk reproducing apparatus (hereinafter referred to as a drive) in the bare disk (disk itself) state, there was a fear that a hand and a finger touches the disk and fingerprints are stuck to the disk, thereby staining the signal recording side. Further, to prevent them, the disk might also be accommodated and used in a cartridge main body having a shutter that opens and closes an opening. In a cartridge system, because the shutter usually closes except when a disk is mounted on a drive, the disk is disconnected from the outside world. Accordingly, the cartridge system is excellent in preventing the disk surface from the dirt caused by dust and fingerprints.

In recent years, instead of a conventional magnetic tape, a camera that uses a disk having excellent accessibility as a recording medium has also started appearing. More downsizing or weight reduction is desired as a camera from the handleability or operability in the same manner as the camera that uses the magnetic tape.

Further, in view of the operating environment of a camera, because the camera is frequently used outdoors, it is desirable that a disk should be used in a form close to the cartridge system in which dust and fingerprints are difficult to stick instead of being used as a bare disk as much as possible.

Next, the prevention of incorrect insertion of a cartridge into a drive is described. Here, the case where an 8-cm DVD-RAM cartridge is used as an example is described with reference to FIGS. 9 and 10.

FIG. 9 is a top plan view when a conventional disk cartridge is inserted correctly into a loader, and FIG. 10 is a top plan view when the conventional disk cartridge is inserted into the loader from the incorrect direction.

The prevention of incorrect insertion is a necessary invention for enabling mounting of a cartridge on a drive only from the specified direction of the cartridge and securely exchanging a signal on a disk in the cartridge opening.

In FIGS. 9 and 10, 1 indicates a disk (shown by a dotted line), 22 indicates a cartridge, and 22c indicates a cartridge main body. An opening 22a is provided in the cartridge main body 22c. 25 is a shutter. 22i is a straight portion at the side of the cartridge main body 22c. The shutter 25 is mounted on the cartridge main body 22c in a slide system. 30 is a loader of the cartridge at the drive side.

Here, the axis that connects the cartridge opening width center from the center O of the disk 1 is a Y-axis and the axis that passes through the center O of the disk 1 and is vertical to the Y-axis is an X-axis. Further, when it is assumed that the length in the Y-axis direction of the cartridge is L0, the length in the X-axis, that is, the width is W0, and the width of the loader 30 is D, the relationship is specified in the specifications so as to satisfy L0>W0, and, moreover the width of the loader is designed to satisfy L0>D>W0.

FIG. 9 shows a state in which the cartridge 22 is mounted in the correct direction, that is, in the Y-axis direction (direction of an arrow E in FIG. 9) to the loader 30. In this case, the cartridge 22 moves in a way in which the straight portion 22i of the cartridge main body 22c is guided to the loader 30. When the cartridge 22 moves to the inside of the loader 30 at a predetermined distance, the shutter 25 slides and opens by a switching apparatus that is not shown and can securely exchange a signal using the disk 1 with the drive side (not shown) via the opening 22a.

On the contrary, FIG. 10 shows the case where a user is attempting to mount the cartridge 22 in the incorrect orientation to the loader 30.

As described previously, because the cartridge length L0, the width W0, and the width D of the loader 30 have a relationship of L0>D>W0, the cartridge 22 will not be inserted into the loader 30 even if the cartridge 22 is mounted in the X-axis direction (direction of the arrow E in FIG. 10) to the loader 30. Accordingly, the erroneous operation of the drive caused by the incorrect insertion of the cartridge can be prevented in advance.

SUMMARY OF THE INVENTION

In a conventional cartridge, because of the placement of a locating hole with a shutter and a drive or a sensor hole for safety of disk information, the shape in which a disk is involved becomes almost square. The projection area of the disk surface to a bare disk increases 127% (a square circumscribed by the disk) or more even to a minimum, resulting in one of the causes that prevent the downsized design of the drive.

Along with the downsizing of a cartridge, the weight reduction of a drive can be realized by downsizing a mechanical chassis on which a disk motor that rotates a disk and a pickup that exchanges a signal with the disk are mounted.

As a characteristic of a camera that uses a disk as a recording medium, photographed disk information (data photographed by a camera) can be read or written directly by a DVD-ROM drive or a DVD-RAM drive that is an external storage device of a personal computer (hereinafter referred to as a PC).

As an example of a storage medium of a camera that uses a disk, for example, an 8-cm DVD-RAM disk can be given. Concerning this 8-cm DVD-RAM disk cartridge, the specification is determined according to the DVD Specifications for Rewritable Disc. According to this specifications manual, the disk can be ejected from the cartridge and the opening width of the cartridge is specified as 26 mm±0.2 mm. On the contrary, for a 12-cm DVD-RAM cartridge, the opening width is determined as 39.0 mm to 39.4 mm according to the DVD Specifications.

Accordingly, usually, in a drive that handles a 12-cm disk, the drive mechanism is designed assuming the use of a cartridge having an opening width of 39 mm or more or bare disk. Therefore, even if the current 8-cm DVD-RAM disk cartridge is mounted on the drive directly or indirectly via an adapter, for example, this 8-cm DVD-RAM disk cannot be used in the state in which the disk is inserted into the cartridge because the cartridge opening width is narrow. Consequently, to use this disk, after the disk is ejected once from the cartridge and then set in the bare disk state, it needs to be mounted on the drive.

In this case, as described previously, when dust and fingerprints are stuck to the surface, the disk is easy to generate a signal read error or write error. Accordingly, when the disk is ejected from the cartridge, the handling must be performed carefully and an inconvenience may also be followed from a standpoint of ease of use.

Further, even if a cartridge is downsized and the shape is changed, the incorrect insertion of the cartridge needs to be prevented.

An object of the present invention is to provide a compact disk case.

Another object of the present invention is to provide a disk case that can easily handle a disk without ejecting the disk from the current 12-cm disk drive, maintaining the handleability of the disk in the same manner as an 8-cm disk cartridge.

To attain the objects of the present invention, in a first invention, the disk case is provided with a disk-type recording medium, a first case body having a first opening for performing recording and reproduction to the recording medium, a second case body having a second opening for performing recording and reproduction to the recording medium, an insertion and withdrawal slot formed at the first and second opening sides of the first and second case main bodies arranged in opposition to each other so as to almost match the position of the first opening and the second opening, and an arm that is held in the first and second case main bodies so as to rotate and opens and closes the insertion and withdrawal slot, and the recording medium is involved between the first case body and the second case body.

In a second invention, the disk case involves a disk-type recording medium and has an opening for recording and/or reproducing a signal to the recording side on the recording medium, and is provided with a case body constituted by forming an insertion and withdrawal slot of the disk-type recording medium at the side of the opening normal to a plane on which the opening is formed and an arm that is supported in the case body by a pivot provided in one end or both ends of the insertion and withdrawal slot of the case body so as to rotate and opens and closes the insertion and withdrawal slot.

In the first or second invention, the plane contour of the disk main body that involves the disk-type recording medium is almost a circle having a straight portion or almost an oval. Further, the arm forms a part of the outline shape of the disk case. Further, the outline projection area of the disk case on a plane almost parallel to the disk-type recording medium is 100% or more and less than 120% of the area of the disk-type recording medium. Further, the opening of the disk case has an opening width of at least 39 mm in the direction where the disk-type recording medium is inserted and withdrawn and in the vertical direction on a plane which the case body is formed.

In the first or second invention, when it is assumed that the maximum length that extends in the opening direction passing through the rotation center of the disk-type storage medium is L and the width of the maximum part in the direction vertical to the opening direction is W, the disk case is constituted so as to satisfy L>W. Further, the case body installs a locating hole for performing positioning to a disk recorder or reproducing apparatus. Further, the maximum thickness of the disk case in which the disk-type recording medium is involved is less than 5.6 mm. Further, the thickness of the region that engages with the opening of the arm is less than 2.8 mm. Further, the case body has a region for holding a member to which the information about the disk is written. Further, the region for holding the member is constituted so that the depth will be a recess of 0.1 mm or more.

BRIEF DESCRIPTION OF THE DRAWINGS

Preferred embodiments of the present invention will be described in detail based on the followings, wherein.

DETAILED DESCRIPTION OF THE PREFERRED EMBODIMENTS

Figure 1:
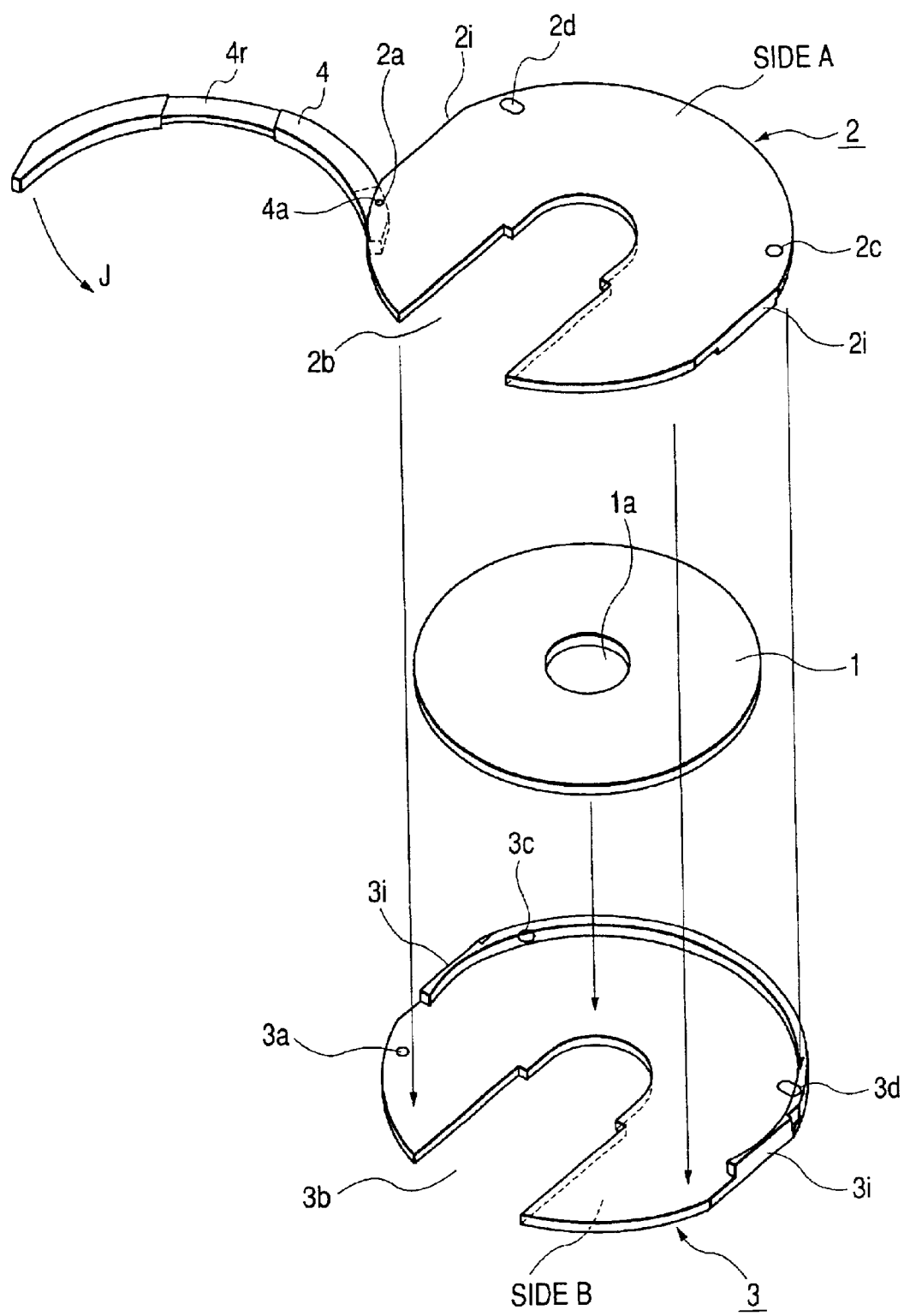
FIG. 1 is an exploded perspective view showing a first embodiment of a disk case according to the present invention.

First, the main symbols used in drawings are shown.

Reference numeral 1 denotes a disk, 2, an upper case body, 3, a lower case body, 2b, 3b, openings, 4, 14, arms, 4r, a region located in the opening of the arm, 22, a cartridge, 25, a shutter, 30, 31, loaders.

Next, the aspects of the present invention are described using the embodiments with reference to the drawings.

A first embodiment of the present invention is described below with reference to FIGS. 1 to 6.

FIG. 1 is an exploded perspective view showing the first embodiment of a disk case according to the present invention. In the drawing, 1 is a disk main body and 1a is a disk center hole having a diameter of about 15 mm. An example when an 8-cm DVD-RAM disk is used as a disk-type recording medium is described here. This disk 1 is of a type having the signal recording side on both the sides. 2 is an upper case body (hereinafter referred to as an upper case) and 3 is a lower case body (hereinafter referred to as a lower case). These items function as a disk case when the disk 1 is involved.

The upper case 2 and the lower case 3 are provided with a drive that is not shown and openings 2b, 3b respectively so that the recording and reproduction of a signal on the disk 1 may be enabled. Holes 2c, 3c on the upper case 2 and the lower case 3 are holes for determining a relative position with the drive that is not shown respectively and circular. On the contrary, holes 2d, 3d are also holes for determining the relative position with the drive that is not shown, and have the shape of almost an oval (long hole) for providing a play in the one direction.

In FIG. 1, the side of the upper case 2 is side A and the side of the lower case 3 is side B. Further, 2i, 3i are straight portions of the upper case 2 and the lower case 3 respectively.

4 is an arm for ejecting the disk 1 from a disk case and is provided with a pivot 4a on the one end. This pivot 4a engages with a hole 2a or a hole 3a provided in the upper case 2 and/or the lower case 3 so as to rotate. Accordingly, the arm 4 can rotate around the pivot 4a. Further, the arm 4 has a region 4r located in the openings 2b, 3b (or that engages with the openings 2b, 3b). This region 4r is located in the part of the openings 2b, 3b of the disk case when the arm 4 rotates around the pivot 4a in the arrow J direction and enters the disk case. The part of this region 4r has a recess in the direction vertical to the disk surface. That is, the part is thinner in the thickness than another part of the arm 4. Further, in this embodiment, the arm 4 forms a part of the disk case contour in the part of the openings 2b, 3b of the disk case.

Further, in this embodiment and the present invention, the disk case is a generic name when the upper case 2, the lower case 3, and the arm 4 are combined as predetermined.

The position where the arm 4 is arranged is described here. When the disk case is mounted on the drive that is not shown or dismounted from the drive, usually, a user handles the disk case holding the opening and the opposite side. The arm can also be arranged in the opening and the opposite side in the structure. If such structure is used, only the arm may be drawn out from the case carelessly when the disk case is mounted on and dismounted from the drive in particular. To prevent such problem from occurring, in this embodiment, the arm 4 is arranged at the side of the openings 2b, 3b.

Figure 2:
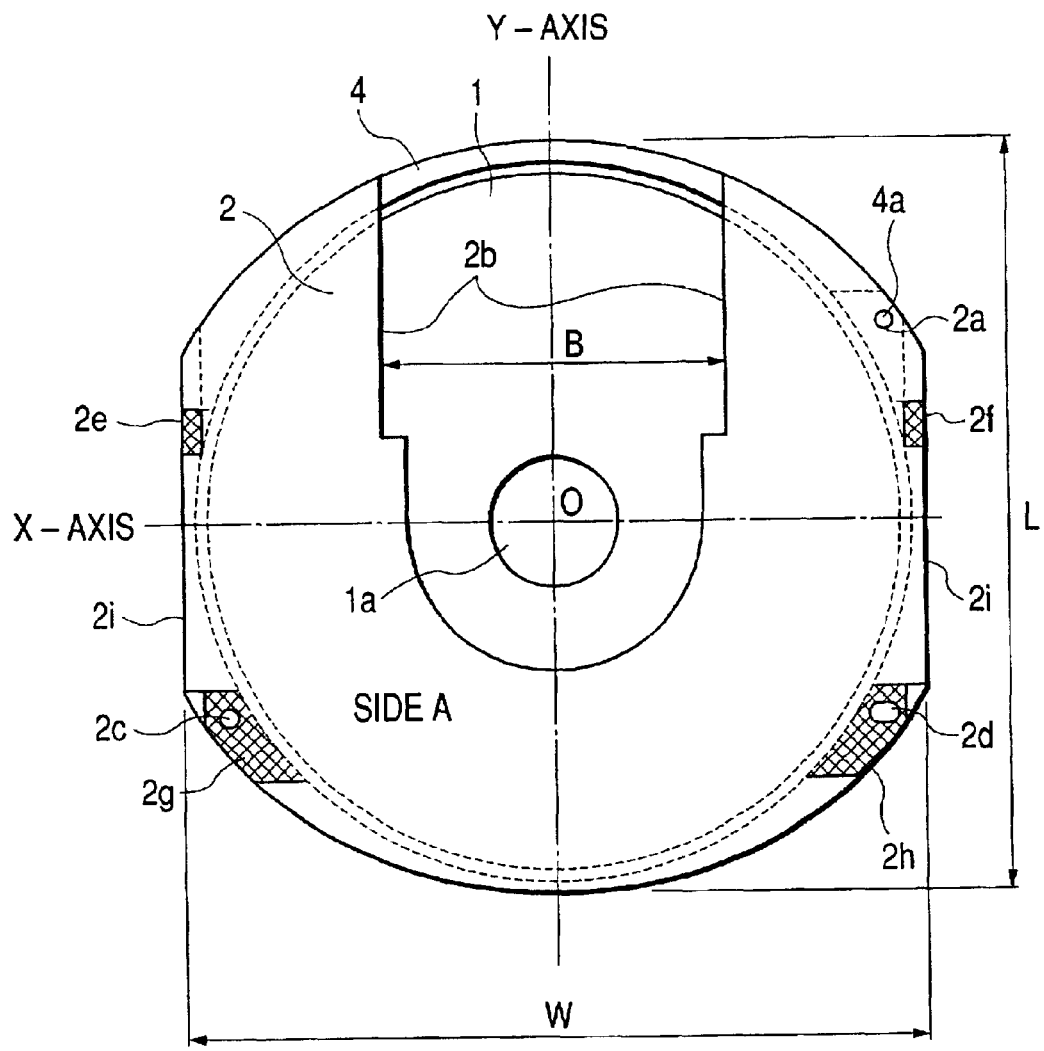
FIG. 2 is a top plan view of the disk case shown in FIG. 1.

FIG. 2 is a top plan view of the disk case shown in FIG. 1. In the drawing, the same symbols are assigned to the same items as FIG. 1 and the description is omitted.

In the drawing, the width B of the opening 2b, that is, the width B in the direction normal to the Y-axis that is the axis in the lengthwise direction of the opening 2b is 39 mm or more. This is the same size as the opening width of the current 12-cm DVD-RAM cartridge specifications. By setting the opening widths 2b, 3b of the disk case in this manner, the recording and/or reproduction of a disk can be performed even in the current DVD-RAM drive. In that case, the disk is mounted on the drive with the disk case as is without ejecting the disk if a simplified adapter is used. Accordingly, by using the disk case of this embodiment, the disk needs not to be put into a bare disk and adhesion of fingerprints needs not to be considered when it is put into the bare disk.

Further, in the upper case 2, the hatched part shown in 2e, 2f, 2g, 2h is a height datum plane of a disk case. When this disk case is loaded on a mechanical chassis of a drive (not shown), the mechanical chassis touches this part, thereby constituting a plane and determining a predetermined height.

Further, because this disk case is used for both disk sides as described previously, the lower case 3 is provided at the rear side of the upper case 2 and has the same shape as the upper case 2.

Further, here, the dimension in the lengthwise direction of this disk case is defined as L, the width is defined as W, and the dimension is determined to satisfy L>W. Accordingly, as described in the prevention of incorrect insertion of the aforementioned prior art, the disk case can be mounted on the drive that is not shown without mistaking the mounting orientation.

The shape of a conventional disk case is almost a square in which a disk is involved. The area of the smallest square circumscribed by a circle is 4/π(π≈3.14)=1.27 times of the area of the circle, that is 127% is the minimum size. The downsizing of the mechanical chassis of the drive on which the disk is mounted is realized for the first time when the disk case becomes compact. The outline projection area of the disk case is set to less than 120% of the outline projection area of the disk. Accordingly, the shape of the disk case is necessarily almost a circle, or of a barrel type, or almost an oval, a polygon exceeding a pentagon, or their combined shape.

Further, in this aspect, as shown in FIG. 2, because the contour of the disk case containing the arm 4 is almost a circle or of a barrel type, the area of the disk case can be set to the area of 100% or more and less than 120% to the outline projection area of the disk 1. Here, in this aspect, an example in which the outline projection area of the disk case is 118% to the outline projection area of the disk 1 is shown.

Figure 9:
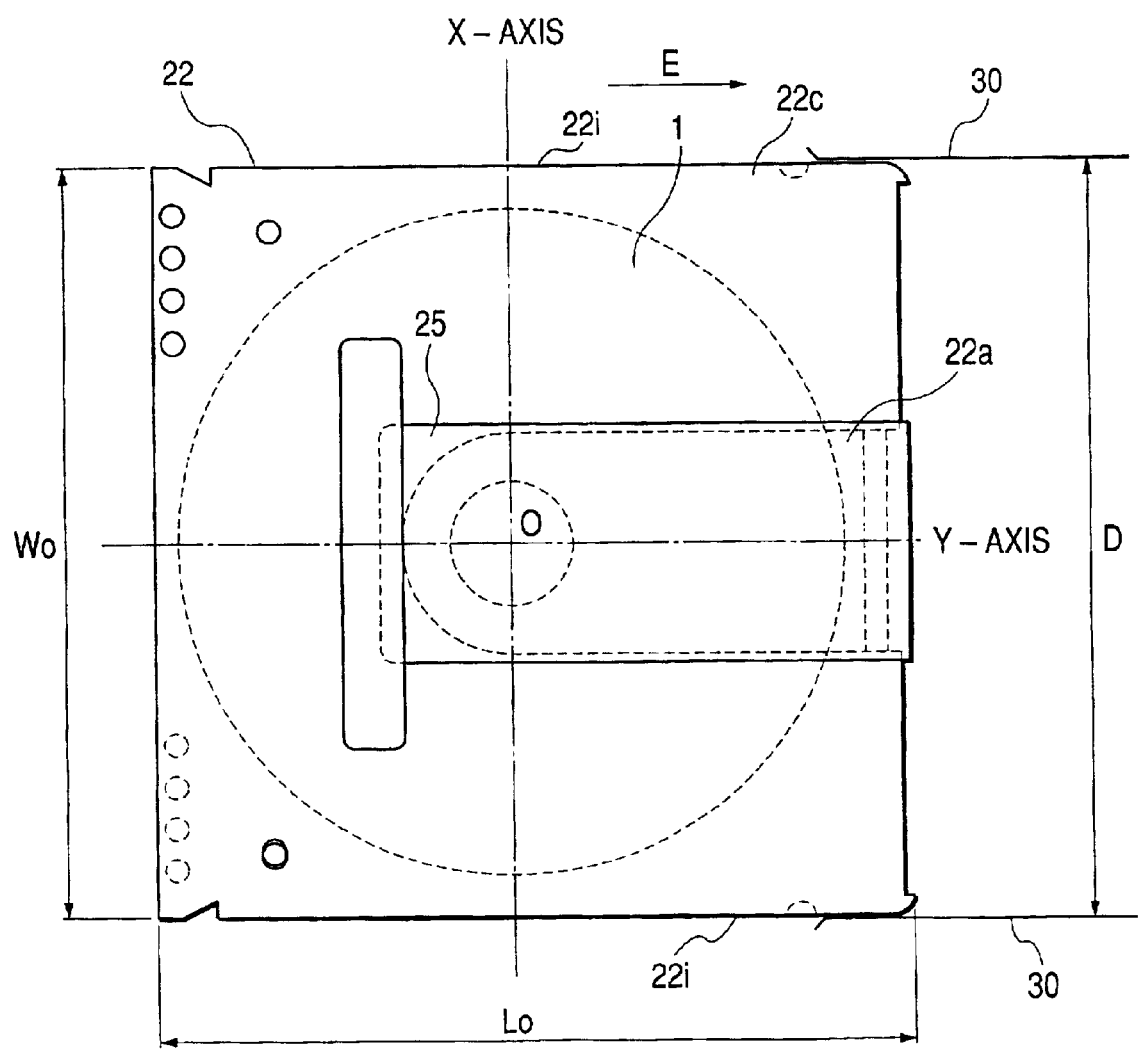
FIG. 9 is a top plan view when a conventional disk cartridge is inserted correctly into a loader.
Figure 10:
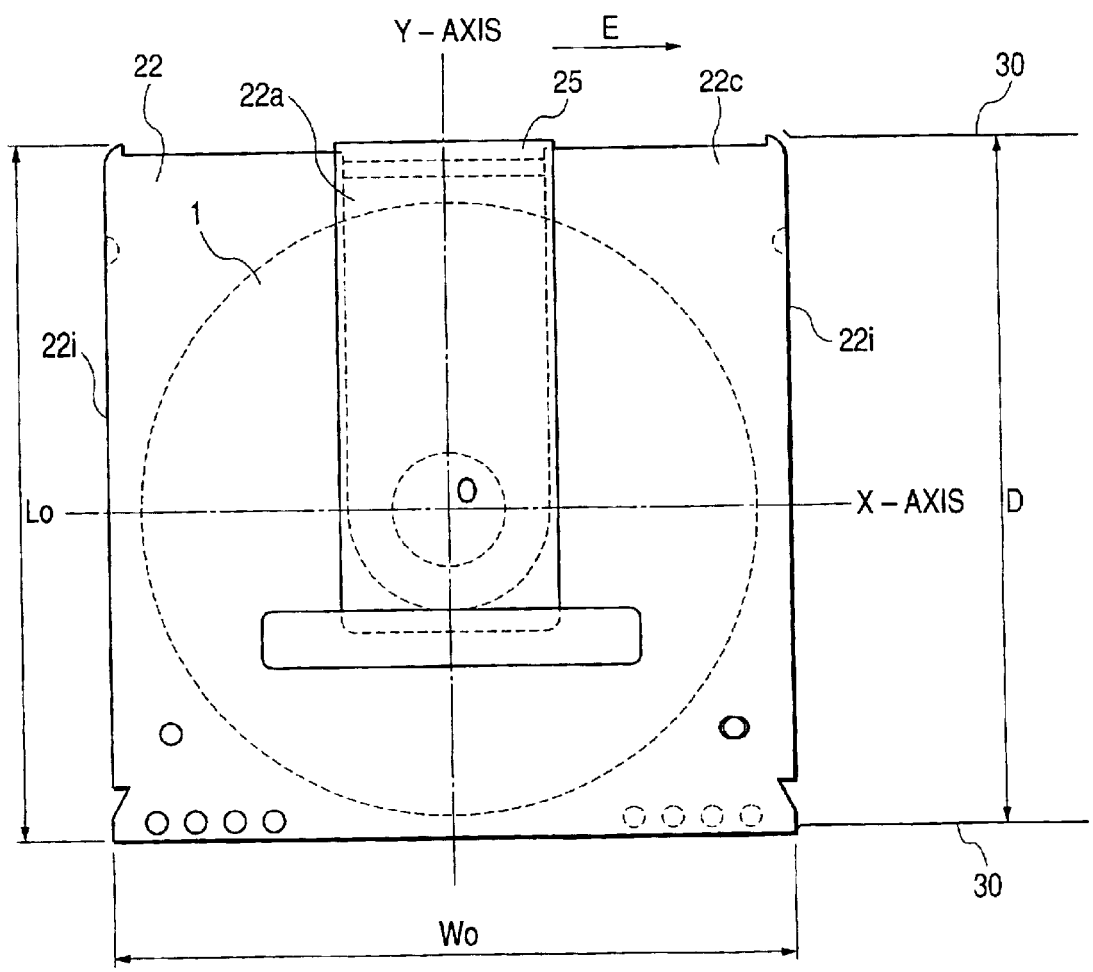
FIG. 10 is a top plan view when the conventional disk cartridge is inserted into the loader from the incorrect direction.

That is, in this embodiment, because the projection area from the top can be reduced in comparison with the conventional cartridge shown in FIGS. 9 and 10 that were described previously by forming a disk case into the shape as shown in FIGS. 1 and 2, the downsizing of a drive (not shown) that loads this disk case can be realized.

Figure 3:
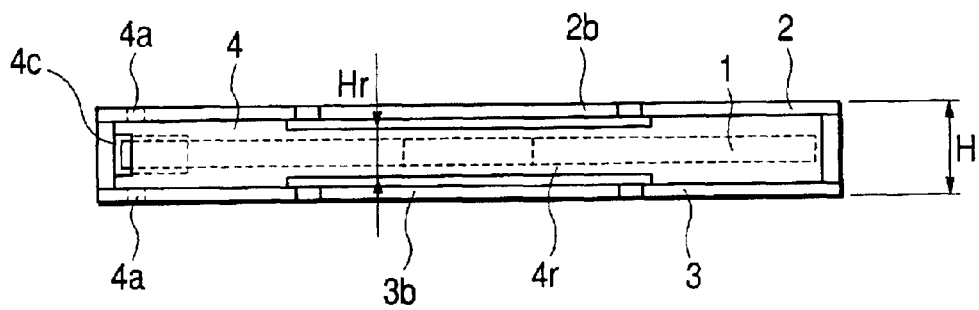
FIG. 3 is a front view of the disk case shown in FIG. 1.

FIG. 3 is a top view of the disk case shown in FIG. 1. In this drawing, the disk 1 is shown in a dotted line. The upper case 2, the lower case 3, the arm 4 for ejecting the disk 1 from the disk case, and the region 4r located in the opening parts 2b, 3b of the upper and lower cases 2, 3 in the arm 4 are equal to those shown in FIGS. 1 and 2. The thickness Hr of the region 4r of the arm 4 is set as less than 2.8 mm in this embodiment. This is because the same dimensions as for the recess of the aforementioned 8-cm DVD-RAM cartridge specifications are fixed. Further, because the cartridge thickness is specified as 5.3 mm to 5.6 mm according to the same cartridge specifications, the thickness H is set as less than 5.6 mm even in the disk case according to this embodiment in consideration of the compatibility with a conventional cartridge.

When the disk case of this embodiment is inserted into the drive from the direction of the arm 4 that covers the openings 2b, 3b, the disk case is mounted correctly on the drive because the thickness Hr of the region 4r of the arm 4 is set to less than 2.8 mm. However, when the disk case is inserted into the drive from the direction reverse to the arm 4, the incorrect insertion of the disk into the drive is prevented because the part that corresponds to the region 4r is thicker than the region 4r and the disk case will not be inserted into the drive any more.

Further, in the drawing, 4c is a space provided in the end at the side of the pivot 4a of the arm 4. When the arm 4 opens or the disk 1 is ejected from the case or the disk is inserted into the case, the space is a relief provided to prevent the end in the vicinity of the pivot 4a of the arm 4 from interfering with the disk.

Figure 4:
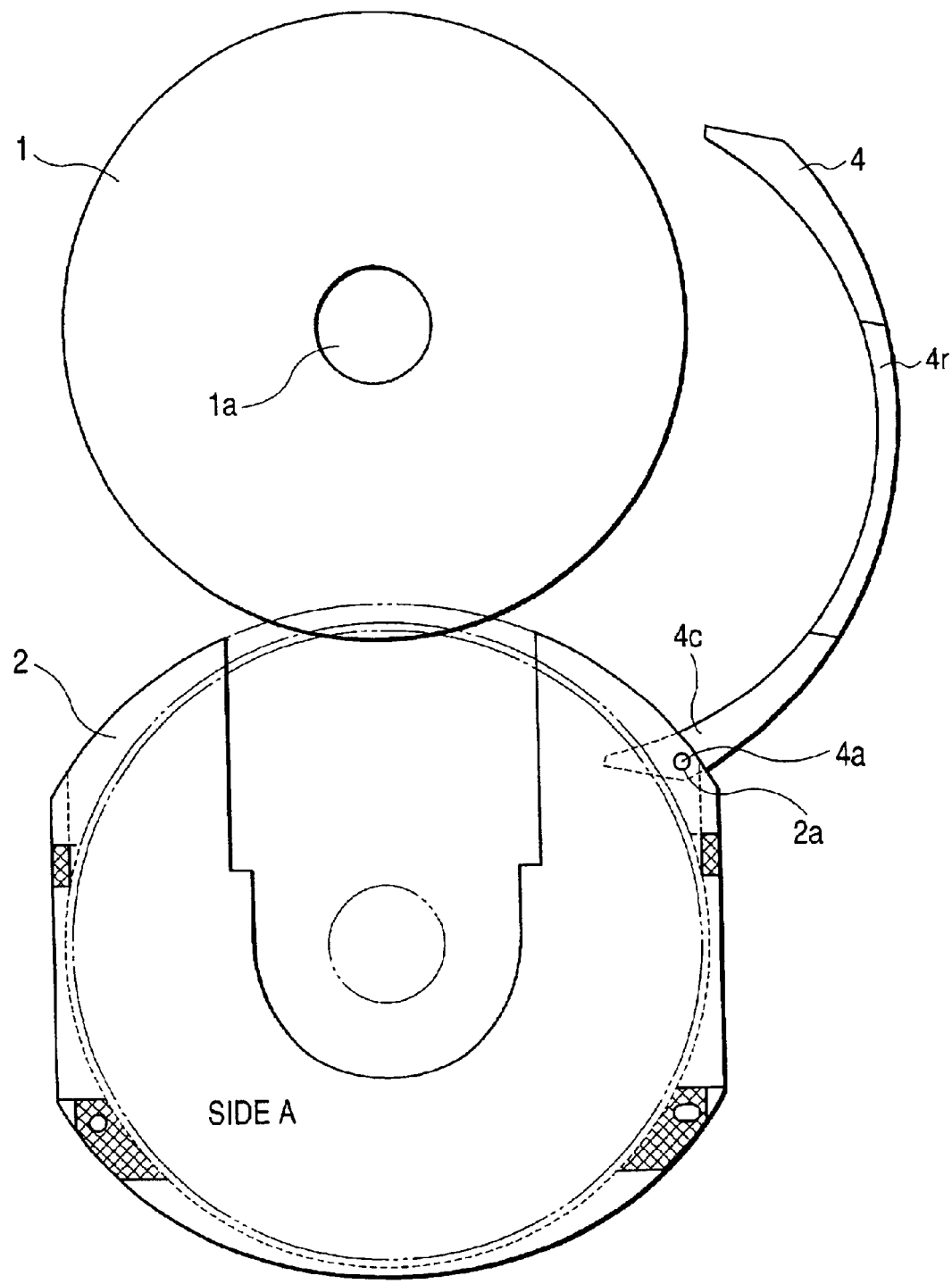
FIG. 4 is a top view showing an embodiment when a disk is ejected from a disk case.

FIG. 4 is a top view showing an embodiment when a disk is ejected from a disk case.

The arm 4 of the disk case opens and closes for the disk case by rotating the arm 4 together with the pivot 4a. Accordingly, when the disk 1 is ejected from the disk case, the arm 4 is rotated and the openings 2b, 3b are opened. Thus, the disk 1 can be ejected to the outside from the disk case via the space 4c provided not so as to interfere with the arm 4. By making the disk case have such structure, a disk can be ejected from and inserted into the disk case and the disk case can also be mounted on a drive for a bare disk.

Further, in this embodiment, the arm 4 for ejecting a disk is arranged at the outside circumference side of the openings 2b, 3b of the case. Accordingly, when a user ejects the disk 1 from the disk case, for example, the user can easily eject the disk 1 from the disk case by opening the arm 4 so as to rotate clockwise around the pivot 4a in the state of FIG. 4 and inserting and drawing out the finger into and from the disk center hole 1a. Further, when the disk 1 is inserted into the disk case, this procedure ought to be reversed.

Figure 5:
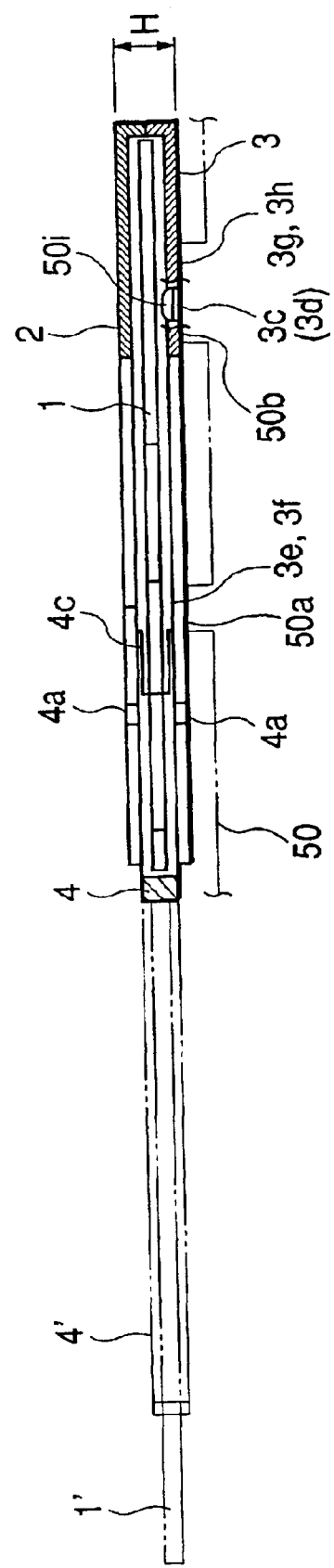
FIG. 5 is a partially sectional side view showing the first embodiment of the disk case according to the present invention.

FIG. 5 is a partially sectional side view showing the first embodiment of the disk case according to the present invention. A dash-single-dot line and a dash-double-dot line are side views showing the state of FIG. 4. The disk 1, the upper case 2, the lower case 3, and the arm 4 (the recess 4r is omitted) are equal to those of FIGS. 1 to 4. Further, in the drawing, 50 shown by the dash-dot-dot line shows a chassis of the drive in which the upper case 2 and the lower case 3 are located. 3c and 3d are holes for determining a relative position with chassis 50 perforated in the lower case 3. The hole 3c is almost a circle and the hole 3d has the shape of almost an oval (long hole). 50a is a locating pin of the disk case implanted on the loading plane between a height datum plane 3e and/or a height datum plane 3f of the lower case 3 on the chassis 50. 50b is a locating pin of the disk case implanted on the loading plane between a height datum plane 3g and/or a height datum plane 3h of the lower case 3 on the chassis 50 in the same manner. 50i is a locating pin of the disk case implanted on the loading plane 50b of the chassis 50.

As shown in FIG. 5, the relative position of the chassis 50 and the disk case is determined when the pin 50i implanted on the loading plane 50b of the lower case 3 of the chassis 50 engages with the hole 3c and/or the hole 3d of the lower case 3.

Further, in FIG. 5, a dash-single-dot line 1' shows a disk ejected from the disk case and a dash-dot-dot line 4' shows an arm when the arm 4 is rotated. In this case, the openings 2b, 3b (refer to FIG. 4) are opened. In the arm 4' shown by the dash-dot-dot line, the region 4r that forms a recess is omitted. Further, the thickness H of the disk case is set to less than 5.6 mm as described previously.

As described above, by using the disk case having the shape described in the first embodiment, a disk case that is more compact than the current 8-cm DVD-RAM cartridge and has the same wide openings 2b, 3b of a 12-cm cartridge can easily be mounted on a 12-cm disk drive without ejecting the disk 1 from the disk case using a simplified adapter. Accordingly, adhesion of fingerprints to the disk due to being put into a bare disk needs not to be considered.

Further, handleability, such as the ejection and insertion of the disk 1 are facilitated, can also be improved by arranging the arm 4 for inserting and ejecting the disk 1 into and from the disk case at the side of the openings 2b, 3b of the disk case.

Further, in this embodiment, the case where the conventional disk 1 used an 8-cm DVD-RAM disk was described. However, in this invention, the disk held in the disk case is not limited to this, and, for example, an 8-cm DVD-R disk and an 8-cm CD-R disk can also be applied.

Further, in the first embodiment, the disk is inserted into and ejected from the case by rotating the arm 4 around the pivot 4a and opening the openings 2b, 3b. However, such configuration is also acceptable that a pivot is provided both ends of the arm 4 and this pivot is inserted into a hole provided in the upper case and the lower case respectively, then the arm 4 is cut anywhere in the circular part or split in the thickness direction.

A second embodiment of the disk case according to the present invention is described below with reference to FIG. 6. In this embodiment, the configuration for further securely preventing the incorrect insertion in the disk case described in the aforementioned first embodiment is shown.

Figure 6:
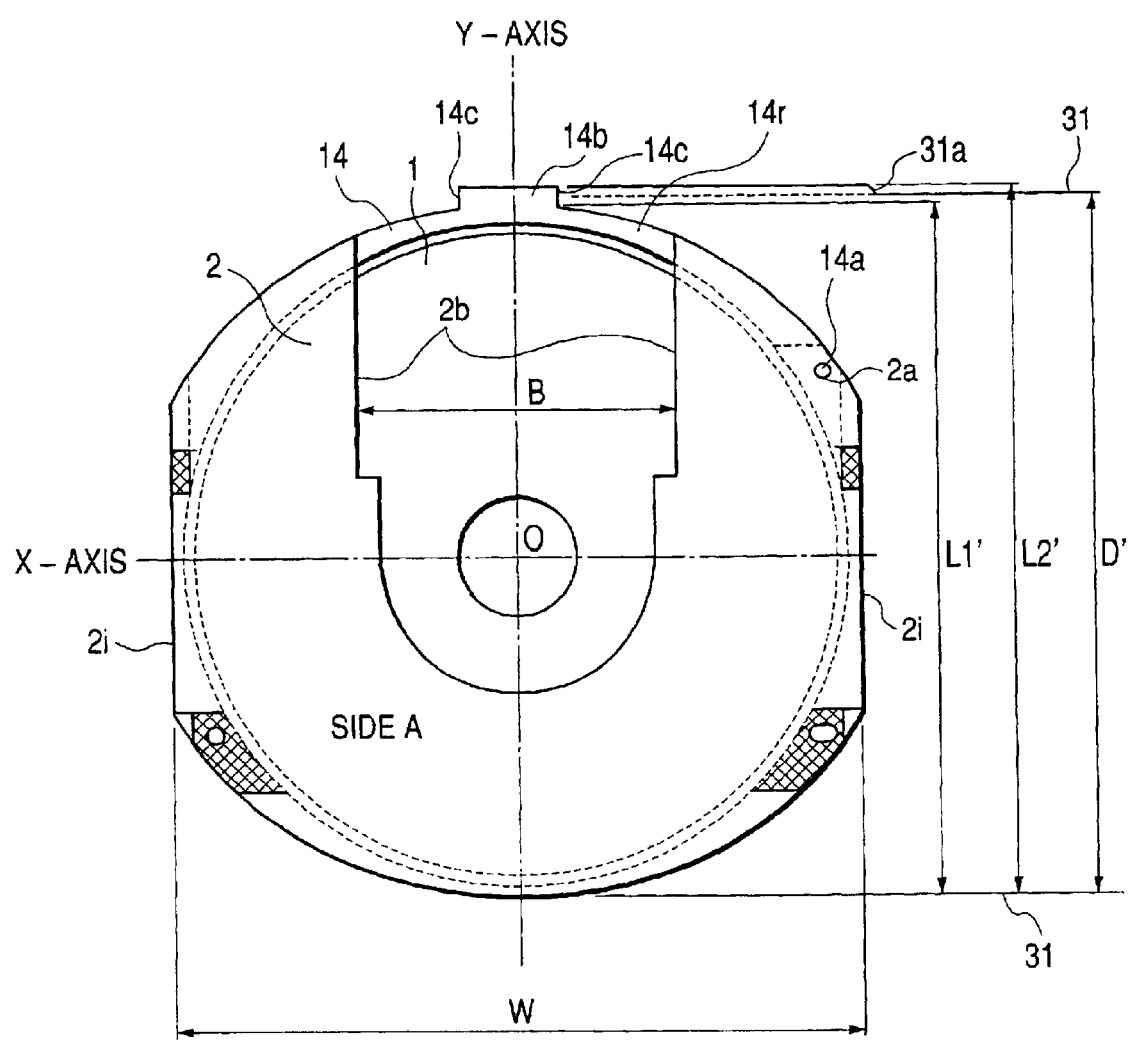
FIG. 6 is a top plan view showing a second embodiment of the disk case according to the present invention.

FIG. 6 is a top plan view showing the second embodiment of the disk case according to the present invention and shows the case where the disk case is attempting to be mounted on the drive from the incorrect direction. In the drawing, 1 is a disk, 14 is an arm, 14a is the pivot of the arm 14, 14b is a part of the arm 14 and a protrusion that extends in the Y-axis forward direction in the drawing, and 14c is the vertical plane at the protrusion side. Further, 2 is an upper case, 2a is a hole that engages with the arm 14, and 2b is an opening. Further, 31 is a drive loader part and shown in a simplified form. 31a shows the loader end at the direction side into which the disk case is inserted. 2i is a straight portion at the side of the upper case 2 and guided into the loader part 31 when the disk case is mounted on the drive in the correct direction.

Further, in FIG. 6, W indicates the width of the disk case according to the present invention, L1' indicates the length from the edge in the direction opposite to the opening to the rise part of the protrusion 14b of the arm 14 in this disk case, and L2' indicates the length from the edge in the direction opposite to the opening of the disk case to the edge of the protrusion 14b of the arm 14. Further, D' indicates the width of the loader 31. Here, because either of the loader ends 31a touches a protrusion vertical plane 14c of the arm 14 by setting the disk case so as to satisfy a relationship of L2'>D'>L1'>W, incorrect insertion can be prevented.

Further, the thickness that corresponds to the vertical direction at the side of the disk 1 in a region 14r located in the opening 2b of the arm 14 is set to less than 2.8 mm in the same manner as the first embodiment.

A third embodiment is described below with reference to FIGS. 7 and 8.

Figure 7:
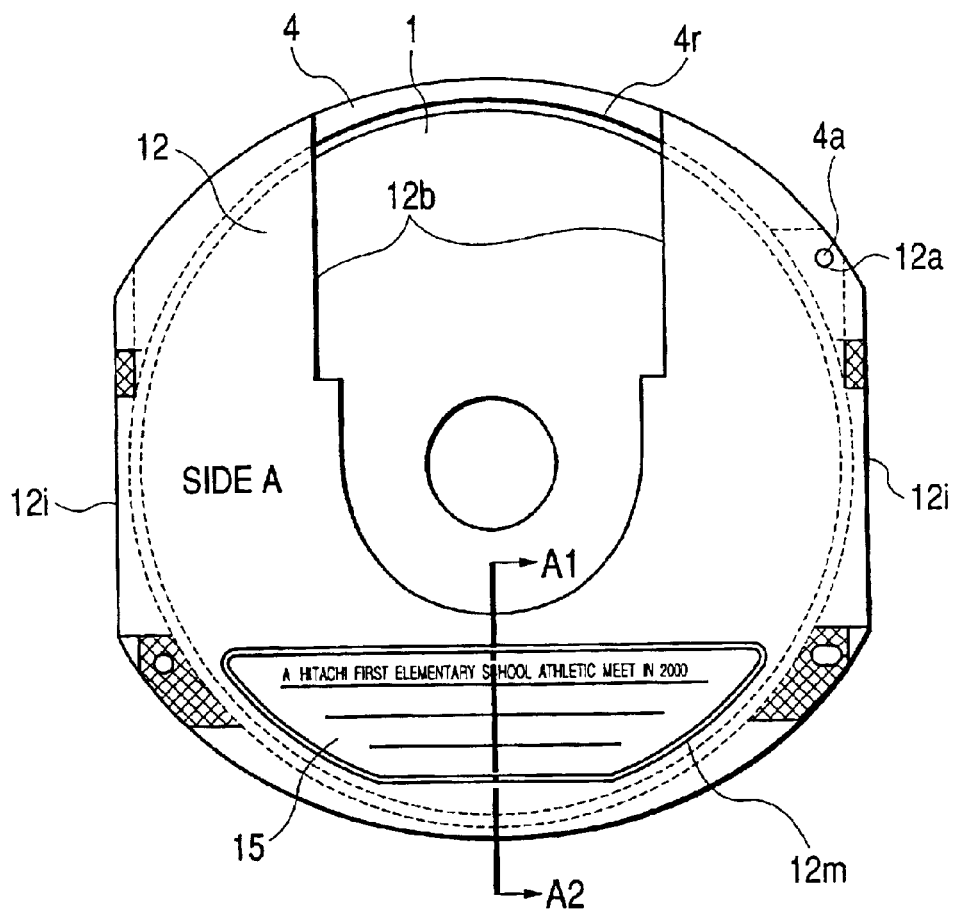
FIG. 7 is a top plan view showing a third embodiment of the disk case according to the present invention.
Figure 8:
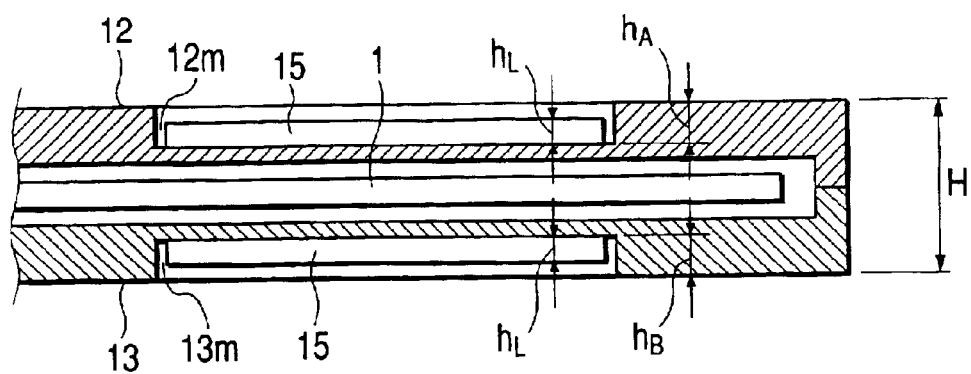
FIG. 8 is the A1 to A2 sectional view of FIG. 7.

FIG. 7 is a top plan view showing the third embodiment of the disk case according to the present invention and FIG. 8 is the A1 to A2 sectional view of FIG. 7. In the drawing, is a disk, 4 is an arm, and 4a is the pivot of the arm 4. Further, 12 is an upper case, 12a is a hole that engages with the pivot 4a of the arm 4, 12b is an opening, 12i is the straight portion at the side of the upper case 12, and 12m is the label region described later. 15 is a label in which a user describes the contents of a disk and pastes them on the disk case.

In FIG. 8, 12 is the upper case and 12m indicates the recess of the upper case and a label region. Further, 13 is a lower case and 13m indicates the recess of the lower case and a label region. Here, hA is the depth of the recess that is this label region and hL indicates the label thickness respectively. Normally, because the label thickness hL is about 0.1 mm, the thickness H in which the upper case 12 and the lower case 13 are combined will not increase by setting the recess thickness hA to 0.1 mm or more. Accordingly, also in this case, the height H of the disk case can be set to less than 5.6 mm in the aforementioned first embodiment.

As described above, in the first or third embodiment according to the present invention, because these disk cases are more compact than the current 8-cm DVD-RAM cartridge and the opening width corresponds to the opening width of a 12-cm DVD-RAM cartridge, a drive can be made compact. Further, even when the disk case is mounted on a 12-cm drive, it can easily be mounted via a simplified adapter without ejecting the disk from the disk case.

Further, handleability, such as the insertion and ejection of the disk are facilitated, can be improved by arranging the arm for inserting and ejecting the disk into and from the disk case at the opening side of the disk case.

Further, in the first to third embodiment according to the present invention, the case where an 8-cm DVD-RAM disk is mainly used as a recording medium is described. However, the scope of this disk case is not limited to this. If the diameter of the disk is 8 cm, for example, the disk case that can be applied to a DVD-R disk, a CD-R disk, a CD-ROM disk, and a musical CD disk is also acceptable.

As described above, according to the present invention, the downsizing of a disk case can be attained. Further, a disk can easily be ejected from and inserted into the disk case by arranging an arm at the opening side used when the disk is ejected and inserted. Further, when the disk case is mounted on a drive or dismounted from the drive, the arm can be prevented from being drawn out carelessly.

Further, a drive as well a disk case can be downsized, maintaining ease of disk handling in the same manner as an 8-cm disk cartridge.

This is because the compact design of the drive can be realized by downsizing the disk case and also eliminating the corner from a mechanical chassis that was almost square previously.

Further, the disk case can easily be mounted on a 12-cm drive without ejecting the disk by having the equal opening width as a 12-cm cartridge.

Moreover, a label region in which the contents of the disk are described and pasted can be secured on the disk case.

As described above, according to the present invention, the disk case, the mechanical chassis, and, finally, the drive can be downsized.

Further, the disk case can easily be mounted on the 12-cm drive, maintaining the ease of handling of the disk in the same manner as an 8-cm disk cartridge.

What is claimed is:

1. A disk case adapted for accommodating an exchange of a disk-recording medium, comprising:

an upper case body having a first opening part for performing recording to or reproduction from said recording medium, said first opening part including a first parallel opening part having sides extending in a predetermined substantially parallel direction from an outer side of said upper case body to a central portion of the upper case body so as to connect to a first semicircular part located at the central portion of said upper case body; and a lower case body having a second opening part for performing recording to or reproduction from said recording medium, said lower case body being oppositely arranged to said upper case so that the recording medium can be accommodated between the upper case body and the lower case body, said second opening part being oppositely arranged to said first opening part, said second opening part including a second parallel opening part having sides extending in a predetermined substantially parallel direction from an outer side of said lower case body to a central portion of the lower case body so as to connect to a second semicircular part located at the central portion of said lower case body, wherein said first parallel opening part and said second parallel opening part are formed so that widths of said first parallel opening part and said second parallel opening part are wider than widths of said first and second semicircular parts, such that the recording medium is always exposed to the outside of said disk case; and the upper case body and the lower case body have outline shapes comprising: a pair of substantially parallel straight line parts oppositely provided and mutually parallel with said first and second parallel opening parts; and a pair of rounded parts oppositely provided and connected to the pair of substantially parallel straight line parts, and each of said rounded parts has a larger radius than that the recording medium when the upper case body and the lower case body are projected on a plane substantially parallel to the recording medium.

2. The disk case according to claim 1, wherein said outlines of the upper case body and the lower case body are formed so that an interval formed between the pair of substantially parallel straight line parts is smaller than an interval formed between the pair of rounded parts when the upper case body and the lower case body are projected on a plane substantially parallel to the recording medium.

3. The disk case according to claim 1, further comprising:

a slot for inserting and withdrawing the recording medium, the slot being formed on the periphery of the first and second opening parts; and an arm for opening and closing said slot;

wherein said recessed portion is constructed as a part of the arm.

4. A disk case adapted for accommodating an exchange of a recording medium, comprising:

an upper case body having a first opening part for performing recording to or reproduction from said recording medium; and a lower case body having a second opening part for performing recording to or reproduction from said recording medium, said lower case body being oppositely arranged to said upper case so that the recording medium can be accommodated between the upper case body and the lower case second opening part being oppositely arranged to said first opening part;

wherein said first opening part and said second opening part are formed so that the recording medium is always exposed to the outside of said disk case, said upper case body and said lower case body having outline shapes comprising: a pair of substantially parallel straight line parts oppositely provided; and a pair of rounded parts oppositely provided and connected to the pair of substantially parallel straight line parts, wherein each of said rounded parts has a larger radius than that of the recording medium when the upper case body and the lower case body are projected on a plane substantially parallel to the recording medium.

* * * * *